United States Patent [19]
Matthias

[11] 3,746,304
[45] July 17, 1973

[54] VALVE CONSTRUCTION

[75] Inventor: Karl Matthias, Viernheim/Hessen, Germany

[73] Assignee: Bopp and Reuther GmbH, Mannheim-Waldhof, Germany

[22] Filed: Feb. 26, 1971

[21] Appl. No.: 119,413

Related U.S. Application Data

[63] Continuation of Ser. No. 748,028, July 26, 1968, abandoned.

[52] U.S. Cl. .............................................. 251/327
[51] Int. Cl. ............................................. F16k 3/12
[58] Field of Search ..................... 251/326, 327, 328

[56] References Cited
UNITED STATES PATENTS
| | | | |
|---|---|---|---|
| 2,911,188 | 11/1959 | Anderson | 251/327 |
| 3,160,389 | 12/1964 | Schmitz | 251/327 |

FOREIGN PATENTS OR APPLICATIONS
| | | | |
|---|---|---|---|
| 1,163,626 | 2/1964 | Germany | 251/327 |
| 891,773 | 3/1962 | Great Britain | 251/327 |
| 925,137 | 5/1963 | Great Britain | 251/327 |
| 104,275 | 5/1964 | Norway | 251/327 |
| 1,218,240 | 12/1959 | France | 251/326 |
| 1,245,664 | 7/1967 | Germany | 257/326 |

*Primary Examiner*—Arnold Rosenthal
*Attorney*—Michael S. Striker

[57] ABSTRACT

A gate valve comprises a valve housing having an annular valve seat which surrounds a passage for flow of a fluid. A valve disc is received in the housing and is movable to and from a sealing position engaging the valve seat. The valve disc has a circumferentially extending sealing surface and an axially directed sealing surface. A sealing element is carried by the valve disc on the sealing surfaces thereof. It comprises a first portion extending along the circumferentially extending surface and a second portion extending along the axially directed surface. The surface area of the second portion is greater than the surface area of the first portion and both portions engage the valve seat when the valve disc is in sealing position, the first portion under radial pressure and the second portion under axial pressure of the fluid.

7 Claims, 8 Drawing Figures

Inventor:
KARL MATTHIAS

VALVE CONSTRUCTION

This application is a continuation of Ser. No. 748,028, filed July 26, 1968, and now abandoned.

BACKGROUND OF THE INVENTION

The present invention relates generally to valve constructions, and more particularly to a gate valve.

Gate valves comprise housings provided with a passage for the flow of fluid, and an annular valve seat surrounding the passage. A valve disc is slidable across the passage into and out of engagement with the valve seat. A screw spindle or other suitable means is provided for effecting this slidable movement of the valve disc.

Gate valves are, of course, known in a great variety of different constructions. The problem with which the present invention is specifically concerned is the sealing engagement between the valve disc and the valve seat in such gate valves. Conventionally, it is known to provide such valve discs of somewhat conical cross-section, that is of wedge-shaped cross-section, and to provide sealing portions on the abutment faces of the valve disc which are then wedged into sealing engagement with the valve seat as the disc is moved to sealing position. The sealing engagement in the various constructions of known gate valves is a composite engagement, that is the valve disc engages the valve seat both in radial direction of the valve disc, and in axial direction. The engagement in radial direction results from the force exerted upon the valve disc for moving the same to ceiling position, and the engagement in axial direction results from the wedging force and/or the force of fluid which acts upon the valve disc when the same is in sealing position.

The problem with all known types of constructions of gate valves using such arrangements is the fact that relatively significant pressure must be exerted which over a period of time leads to a deformation and/or damage of the sealing portions, thus making the sealing action unreliable.

It is thus a general object of the present invention to provide a valve construction which is not subject to these disadvantages.

A more particular object of the invention is to provide a gate valve wherein these disadvantages are avoided.

Still more particularly, the invention aims to provide a sealing action in such a gate valve wherein the possibility of deformation and/or damage of the sealing portions is eliminated or at least significantly reduced.

SUMMARY OF THE INVENTION

In pursuance of the above objects, and of others which will become apparent, one feature of my invention resides in the provision of the valve which comprises valve housing having an annular valve seat surrounding a passage through which a fluid is adapted to flow, and a valve disc received in the housing. The valve disc is movable between a retracted position and a sealing position and has a circumferentially extending sealing surface and an axially directed sealing surface. A sealing element is carried by the valve disc on the sealing surfaces thereof and has an outer side for sealingly engaging the valve seat when the valve disc is in sealing position thereof. In accordance with my invention the sealing element comprises a first portion which extends along the circumferentially extending surface and a second portion which extends along the axially directed surface, the surface area of the second portion being greater than the surface area of the first portion.

Advantageously, the surface area of the second portion will be substantially double that of the surface area of the first portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
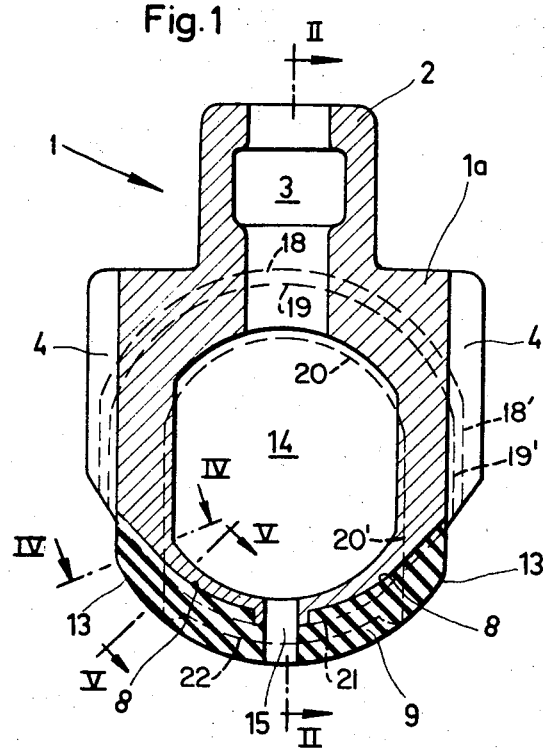
FIG. 1 is a vertical section through a valve disc or gate embodying my invention.

Discussing now the drawing in detail it will be seen that in FIG. 1 I have illustrated a valve gate or disc 1 of a gate valve. As the hatching shows, the valve disc 1 is of metallic material. It is not believed necessary to illustrate the housing of the gate valve, because this is conventional and well known to those skilled in the art, as is the manner in which such housings are provided with annular valve seats.

Also in known manner, the valve disc 1 is hollow it has a main body portion 1a and is provided in an upper projecting portion 2 with a recess 3 adapted to receive a spindle nut with which the non-illustrated spindle effecting sliding movement of the valve member 1 between its retracted position and sealing position, will threadedly engage. This, also, is known in the art.

Figures 3, 3A:
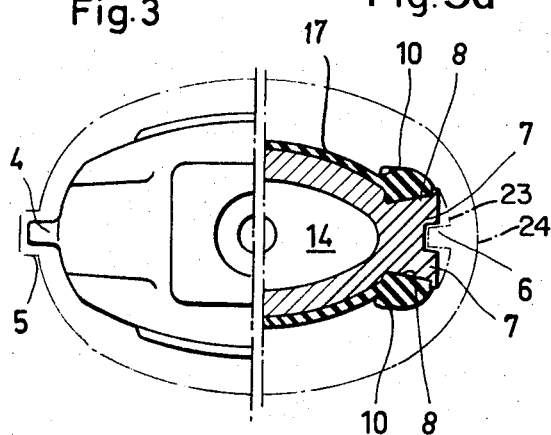
FIG. 3 is a top-plan view of the left-hand side of the valve member of FIG. 1.
FIG. 3a is a horizontal section through a slightly modified valve member of the type shown in FIG. 1.

As FIG. 3 shows, the main body portion 1a of valve disc 1 is of substantially oval or elliptical cross-section when seen in top-plan view. It is provided on its lateral circumferential surface at opposite sides thereof with guide ribs 4 which engage in recesses 5 of the valve housing, which latter is suggested diagrammatically in FIG. 3 by the chain-line shown therein. Of course, it will be clear that reversal of this arrangement is readily possible, in which case (compare FIG. 3a) the guide ribs would be provided on the valve housing the inner edge of which is diagrammatically identified by broken line 23 and the outer section of which is similarly identified by broken line 24 and are identified with reference numeral 6, and the valve disc 1 would be provided with corresponding recesses 7 in which the guide ribs 6 could engage. In either case, however, cooperation of these guide portions provided respectively on the valve disc 1 and on the valve housing serves to guide the valve disc between its retracted and its sealing position.

Figure 2:
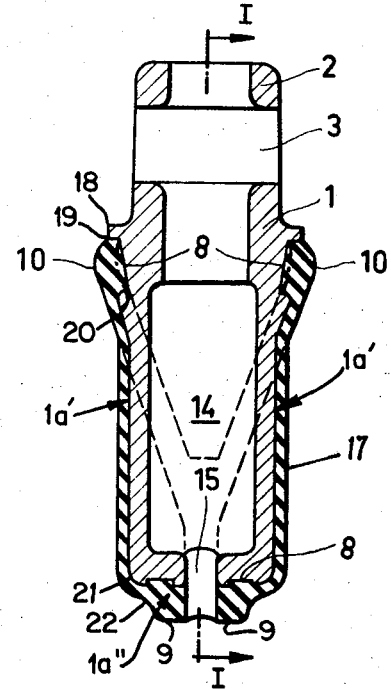
FIG. 2 is a vertical section through FIG. 1, on a plane normal to the plane of the drawing.

As FIG. 2 shows particularly clearly, the valve disc 1 is provided with two axially directed sealing surfaces 1a' located downwardly of the projection 2. Each of these sealing surfaces is provided with recessed grooves 8. Additionally, the lower portion of the valve disc 1 (compare FIG. 1) is provided with a circumferentially extending peripheral edge face or sealing surface 1a'' which is also provided with a recessed groove 8 extending in circumferential direction of this surface. In accordance with the present invention, a sealing element of resilient sealing material is received in these grooves. This sealing element consists of a first portion 9 received in the groove 8 of the circumferentially extending sealing surface of the valve disc 1 and being of resilient sealing material as the hatching in FIGS. 1 and 2 indicates, and two sections which together constitute a second portion of resilient sealing material identified with reference numeral 10. These sections fork off from the first portion 9, with which they are of one-piece construction, and this forking takes place in such a manner that the portion 9 terminates below the guide projections 4, or their counterparts in form of recesses 6, so that from below and to either axial side of the respective guide projection 4 or recess 6 there extends an arcuately curved section of the second portion 10 of the sealing element. Of course, each of these sections is integral with the portion 9 at the opposite ends of the latter, as will be in FIG. 1.

Reference numerals 18 in FIGS. 1 and 2, and the associated broken line in FIG. 1, illustrate the outer contour of the valve disc (compare FIGS. 1 and 2). Reference numeral 19 indicates the upper contour edge of the groove 8, and numeral 20 the lower contour edge thereof. Broken line 18' shows the outer beveled edge of valve disc 1, numeral 19' the outer contour edge of portion 10 and numeral 20' the inner contour edge of portion 10. Reference numeral 21 (compare FIGS. 1 and 2) illustrates the lower edge of disc 1, and numeral 22 designates the indicated corner of the sealing element. In FIG. 2 the Y-shaped broken line indicates — for better understanding — the configuration of the sealing element portions on the side edges of the valve disc 1.

Figure 4:
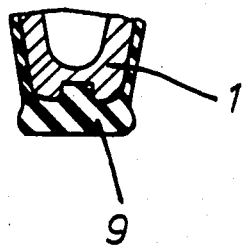
FIG. 4 is a fragmentary section through a valve disc of the type shown in FIG. 1.
Figure 4A:
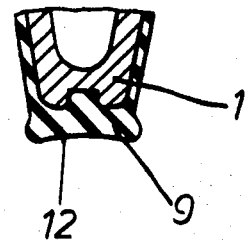
FIG. 4a is a view similar to FIG. 4 but illustrating a modified embodiment.
Figure 4B:
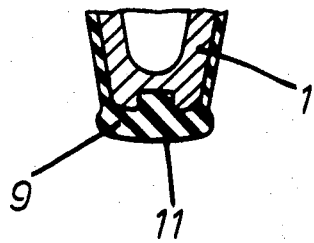
FIG. 4b is also a view similar to FIG. 4 but illustrating a further modified embodiment.
Figure 5:
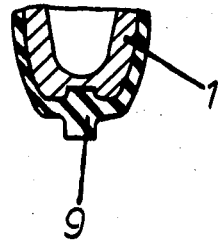
FIG. 5 is a similar fragmentary section, but taken at a level lower than the section of FIG. 4.

As illustrated in FIG. 4, the outer side of the sealing element consisting of the portions 9 and 10 may be planar in the region of the juncture between the portions 9 and 10. FIG. 4b shows that it may instead be convex, as suggested with reference numeral 11. An alternate possibility would be for this outer side to be concave, as shown by reference numeral 12 in FIG. 4A.

It will be appreciated that the upper part of the sealing element, that is the portion 10 thereof, constitutes a seal which is substantially the result of fluid pressure acting upon the valve disc 1 and urging a respective section of the portion 10 into sealing engagement with the valve seat. The smaller lower part constituted by the portion 9, however, seals as a result of the pressure exerted by the (non-illustrated) spindle which urges the valve disc 1 into sealing position. In view of this it is most important that the juncture between the portions 9 and 10, that is the region where the axial sealing action changes to a radial sealing action, and vice versa, be at the location 13 which latter is below the guide portions 4 (or 6). Furthermore, it will be noted that the portion 9 which effects a seal end direction transversely of the direction of flow of the fluid, provides approximately one-third of the sealing-surface area, whereas the upper portion of the sealing element located in the upper part of the valve disc 1 provides approximately two-thirds of the sealing-surface area.

The sealing element consisting of the portions 9 and 10 may be suitably secured in the grooves 8, for instance by being vulcanized thereinto. Alternately, and thus suggested in FIG. 2, the arcuate portion 10 and the arcuate portion 9 may also be suitably secured onto the respective axially directed sealing surfaces of the valve disc 1, and may be connected by a relatively thin layer 17 of the same material, or other material, which may serve as a corrosion protection for the valve disc 1 and will cover the entire respective axially directed sealing surface thereof. Of course, the layer 17 may also be provided on the illustrated case (compare FIG. 2) where the sections constituting the portion 10 are actually received in the respective groove 8.

Advantageously, the hollow interior 14 of the valve disc 1 will be provided at its lowermost point with suitable aperture means, for instance a bore 15, communicating with the exterior. FIGS. 1 and 2 show that in the illustrated embodiment the bore 15 penetrates through the portion 9. However, other possibilities will offer themselves readily to those skilled in the art.

Under certain circumstances, for instance if an elastic but relatively stiff material is used for the sealing element consisting of the portions 9 and 10, it may be necessary to enhance the ability of the sealing element to elastically conformance of into sealing engagement with the valve seat. For this purpose the portions 9 and 10 may be either entirely hollow, or they may be provided with hollow portions at selected suitable locations. Another possibility is to provide the portions 9 and 10 at their inwardly directed side, that is inwardly of the outer side of the sealing element, with hollowed-out recesses. Such recesses may be in form of grooves which extend over the entire elongation of the sections constituting the portion 10 as well as the portion 9, or they may be provided at selected locations, for instance only in the region of the juncture between the portion 9 and the portion 10. Needless to say, either section of the portion 10, or for that matter the portion 9, may alone be provided with such recesses or hollow chambers, or in conjunction with the other portion or section, respectively. The provision of this expedient in the region of the juncture between the portions 9 and 10 is particularly desirable because this region is apt to be most critical as far as sealing efficiency is concerned, and also as far as possible abrasion damage to the sealing element is concerned.

It will be understood that each of the elements described above, or two or more together, may also find a useful application in other types of constructions differing from the types described above.

While the invention has been illustrated and described as embodied in a valve construction, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A gate for a gate valve having a passage through which a fluid is adapted to flow, comprising a valve disc movable across said passage between a valve opening position and a valve closure position, said valve disc having an upper projecting portion and a main body portion having an upper end and a lower end, said main body portion being provided with two substantially planar axially directed surfaces adapted to extend transversely of said passage and each formed with a downwardly curved first groove, and with a peripheral edge face extending in the region of said lower end from one to the other of said axially directed surfaces and formed with a second groove elongated intermediate said axially directed surfaces; upright elongated guide portions extending at opposite lateral sides of said main body portion intermediate said surfaces from said upper end toward said lower end and each having a lower end portion; and a sealing element carried by said main body portion and including a pair of downwardly curved first resilient strip-shaped sealing element portions each provided in one of said first grooves of said surfaces and being downwardly and inwardly inclined towards one another from said upper end more than half-way of the distance toward said lower end, and a single second resilient strip-shaped sealing element portion at least in part received in said second groove and merging with said first sealing element portions in the region below said lower end portions of said guide portions, said first sealing element portions having a combined sealing surface area equal to about two-thirds of the total sealing surface area of said sealing element and serving to provide axial sealing contact in said passage when said valve disc is in said valve closure position, and said second sealing element portion having a sealing surface area equal to about one-third of the total sealing surface area of said sealing element and serving to provide radial sealing contact in said passage when said valve disc is in said valve closure position.

2. A gate as defined in claim 1; further comprising cavity means provided in said sealing element inwardly of the outer side thereof for facilitating elastic deformation of said sealing element.

3. A gate as defined in claim 2, said cavity means being provided at least in said first strip portions of said sealing element.

4. A gate as defined in claim 1, said first strip portions each having a partly concave outer side.

5. A gate as defined in claim 1, said second sealing element strip portion being integral with said first sealing element portions.

6. A gate as defined in claim 1, said main body portion being hollow; and further comprising aperture means communicating with the interior of said main body portion at said lower end thereof.

7. A gate as defined in claim 1, said first strip portions each having an outer side which is in part outwardly convex.

* * * * *